Feb. 11, 1969      H. H. MALLEY ET AL      3,427,001
                   AEROFOIL SHAPED BLADE
                    Filed Jan. 6, 1967

United States Patent Office 3,427,001
Patented Feb. 11, 1969

3,427,001
AEROFOIL SHAPED BLADE
Harry Hartley Malley, Derby, and Gordon Allan Halls, Littleover, Derby, England, assignors to Rolls-Royce Limited, Derby, England, a British company
Filed Jan. 6, 1967, Ser. No. 607,814
Claims priority, application Great Britain, Jan. 31, 1966, 4,268/66
U.S. Cl. 253—39.15     3 Claims
Int. Cl. F01d 5/08, 5/18

ABSTRACT OF THE DISCLOSURE

An aerofoil-shaped blade which has an inlet passage which tapers towards the tip of the blade and two outlet passages, positioned adjacent to the edges of the blade, which taper towards the root of the blade. Cooling air is supplied to the inlet passage by way of the root and is directed into the outlet passages through holes in the internal walls, which define the passages. The cooling air is finally allowed to escape either through the tip or through the trailing edge of the blade.

---

This invention concerns an aerofoil-shaped blade adapted for use in a fluid flow machine such as a gas turbine engine.

The term "blade" is used in this specification in a wide sense as including, for example, nozzle guide vanes.

According to the present invention, there is provided an aerofoil-shaped blade adapted for use in a fluid flow machine such as a gas turbine engine and provided internally with at least one tapering, radially extending outlet passage which tapers towards a radially inner portion thereof, and which is disposed adjacent an edge of the blade; the blade also being provided internally with a radially extending inlet passage which tapers towards a radially outer portion thereof and which communicates with the radially inner portion of the or each said outlet passage, means being provided for directing a supply of cooling fluid into the inlet passage radially inwardly of the region in which the latter communicates with the or each outlet passage.

The inlet and outlet passages preferably have at least one common wall.

The inlet passage may be located axially between two outlet passages which are respectively disposed adjacent the leading and trailing edges of the blade. Thus, the two outlet passages may inter-communicate at their radially outer ends.

At least part of the cooling fluid supplied to the blade may escape through the tip thereof. Alternatively or additionally at least part of the cooling fluid supplied to the blade may escape through the trailing edge thereof.

The invention also comprises a gas turbine engine provided with aerofoil-shaped blades as set forth above.

Figure 1:
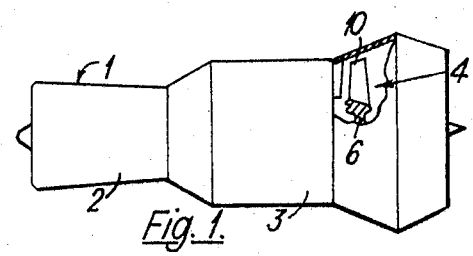
Figures 2, 3:
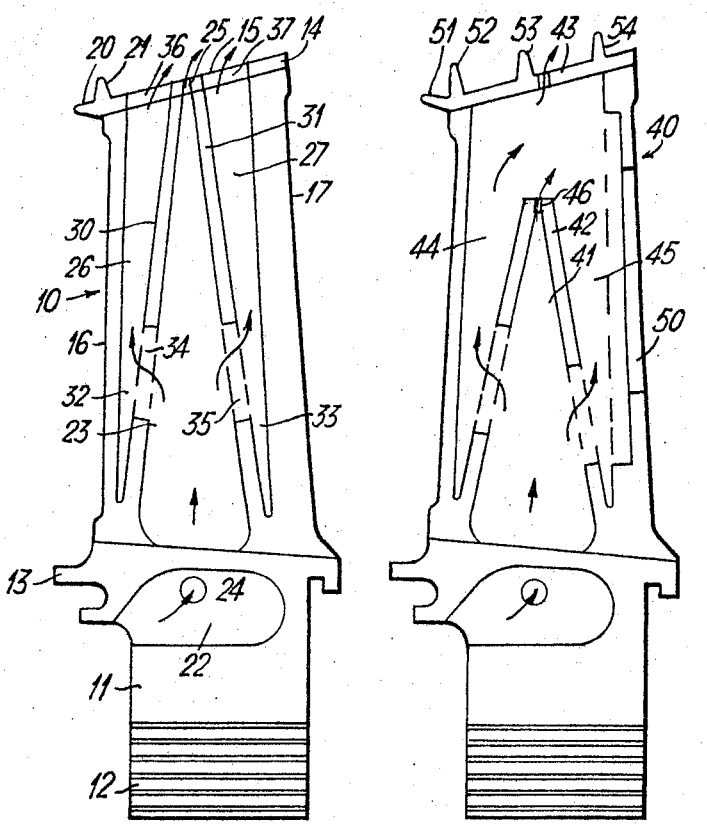

The invention is illustrated, merely by way of example, in the accompanying drawings, in which:

FIGURE 1 is a diagrammatic view, partly in section, of a gas turbine engine provided with turbine rotor blades in accordance with the present invention, FIGURE 2 is a sectional view, on a larger scale, of one of the turbine rotor blades of the engine of FIGURE 1, and FIGURE 3 is a view similar to FIGURE 2 but illustrating a modified form of turbine rotor blade.

In FIGURE 1, there is shown a gas turbine engine 1 having a compressor 2, combustion equipment 3, and a turbine 4 which drives the compressor 2, the turbine exhaust gases being directed to atmosphere through an exhaust duct 5.

The turbine 4 has a rotor disc 6 which is provided with a plurality of angularly spaced apart aerofoil-shaped turbine rotor blades 10. Each of the blades 10 has a root 11 provided with a "fir-tree" portion 12 by means of which is mounted in a correspondingly shaped slot in the turbine rotor disc 6. The blade 10 also has a platform 13 adjacent the root 11, a shroud 14 at the tip 15 of the blade, and leading and trailing edges 16, 17 respectively. The shroud 14 is provided, adjacent the leading edge 16, with sealing ribs 20, 21.

The root 11 is provided with a chamber 22 which may be supplied, by means not shown, with cooling air from the compressor 2.

The blade 10 is provided internally with a radially extending inlet passage 23 whose radially inner end communicates with the chamber 22 by way of a duct 24. The inlet passage 23 tapers towards its radially outer end where it communicates with an aperture 25 in the shroud 14. Part of the cooling air supplied to the inlet passage 23 may escape through the aperture 25 and thus from the tip 15 of the blade.

The blade 10 is also provided internally with two radially extending outlet passages 26, 27 which are respectively disposed adjacent the leading and trailing edges 16, 17 of the blade. The inlet passage 23 is located axially between the outlet passages 26, 27 and has common walls 30, 31 therewith. The outlet passages 26, 27 taper towards their radially inner portions 32, 33.

The walls 30, 31 are respectively provided with apertures 34, 35 through which cooling air from the inlet passage 23 may pass to the radially inner portions 32, 33 of the outlet passages 26, 27 respectively.

As will be seen, the cooling air is directed into the inlet passage 23 radially inwardly of the region in which the latter commnuicates with the outlet passages 26, 27.

The outlet passages 26, 27 respectively communicate at their radially outer ends with apertures 36, 37 in the shroud 14. The cooling air from the outlet passages 26, 27 may thus escape through the apertures 36, 37 and so through the tip 15 of the blade.

It will therefore be appreciated that the cooling air is diffused in the outlet passages 26, 27 in the course of passing from the apertures 34, 35 to the apertures 36, 37. This increases its speed of flow through the apertures 34, 35 and thus improves its cooling efficiency.

It will also be noted that the cooling air is supplied to the inlet passage 23 at the radially inner end thereof where its cross sectional area is greatest, while the air escapes through the radially outer ends of the outlet passages 26, 27 where their cross sectional areas are greatest. Thus the pressure losses involved in supplying air to and withdrawing it from the blade 10 are reduced so as to give increased potential for flow or increased jet velocities, both of which lead to improved cooling. This is particularly important where the blade is a long one.

In FIGURE 3, there is shown a turbine rotor blade 40 which is generally similar to the blade 10, and which for this reason will not be described in detail. The blade 40, however, has an inlet passage 41 whose radially outer end 42 is disposed radially inwardly of the shroud 43 of the blade. The blade has outlet passages 44, 45 which inter-communicate at their radially outer ends.

The radially outer end 42 of the inlet passage 41 is provided with an aperture 46 through which part of the cooling air supplied to the inlet passage 41 may pass to the outlet passages 44, 45.

The trailing edge of the blade 40 is provided with an aperture 50 through which cooling air, which has passed through and been diffused in the outlet passages 44, 45 may pass outwardly of the blade.

In the conduction of FIGURE 3, the shroud 43 in addition to being provided with sealing ribs 51, 52 which respectively correspond to the sealing ribs 20, 21 of the blade 10, is also provided with sealing ribs 53, 54.

We claim:

1. An aerofoil-shaped blade adapted for use in a fluid flow machine such as a gas turbine engine, the said blade having two tapering, radially extending cooling fluid outlet passages which reduce in taper towards a radially inner portion thereof and which are respectively disposed adjacent the leading and trailing edges of the blade, and a radially extending cooling fluid inlet passage which is located axially between said two cooling fluid outlet passages and which reduces in taper towards a radially outer portion thereof, the cooling fluid inlet passage communicating with the radially inner portion of the said cooling fluid outlet passages, means being provided for directing a supply of cooling fluid into the cooling fluid inlet passage radially inwardly of the region in which the latter communicates with the cooling fluid outlet passages, means for the cooling fluid supplied to the blade to escape from the outlet passages radially outwardly of the means for directing the supply of cooling fluid into the inlet passage, and the trailing edge of the blade being apertured whereby at least part of the cooling fluid supplied to the blade escapes through the trailing edge thereof.

2. An aerofoil-shaped blade according to claim 1 wherein the blade at its radially outer portion has a shroud apertured for the escape therethrough of cooling fluid from said outlet passages.

3. An aerofoil-shaped blade according to claim 2 wherein said outlet passages open one into the other short of said shroud.

References Cited

UNITED STATES PATENTS

| 2,848,193 | 8/1958 | Sells et al. | 253—39.15 |
| 3,051,439 | 8/1962 | Hilton | 253—39.15 |

FOREIGN PATENTS

| 872,416 | 4/1953 | Germany. |
| 920,641 | 11/1954 | Germany. |
| 694,241 | 7/1953 | Great Britain. |

EVERETTE A. POWELL, JR., *Primary Examiner.*